(12) United States Patent
Desmarais

(10) Patent No.: US 6,595,371 B1
(45) Date of Patent: Jul. 22, 2003

(54) FLUID FILTER ASSEMBLY

(75) Inventor: Chris Desmarais, Fayetteville, NC (US)

(73) Assignee: Arvin Technologies, Inc., Troy, MI (US)

(*) Notice: Subject to any disclaimer, the term of this patent is extended or adjusted under 35 U.S.C. 154(b) by 0 days.

(21) Appl. No.: 10/084,964

(22) Filed: Feb. 28, 2002

(51) Int. Cl.[7] .............................................. B01D 27/08
(52) U.S. Cl. ...................................... 210/438; 210/450
(58) Field of Search .............................. 210/433.1, 438, 210/446, 448, 450, 454, 116, 435, 437, 440; 123/514

(56) References Cited

U.S. PATENT DOCUMENTS

| | | | |
|---|---|---|---|
| 4,212,739 A | * | 7/1980 | Hilton et al. ............... 210/130 |
| 4,372,847 A | | 2/1983 | Lewis |
| 5,587,071 A | | 12/1996 | Belden |
| 5,637,215 A | | 6/1997 | Albers, Jr. |
| 5,783,076 A | | 7/1998 | Albers, Jr. |
| 6,213,143 B1 | * | 4/2001 | Schwegler et al. ..... 137/115.27 |
| 6,247,486 B1 | * | 6/2001 | Schwegler et al. ..... 137/115.27 |

FOREIGN PATENT DOCUMENTS

| | | | | |
|---|---|---|---|---|
| DE | 3635728 | * | 4/1998 | ................. 210/446 |
| EP | 537521 | * | 4/1993 | ................. 210/446 |

* cited by examiner

*Primary Examiner*—Matthew O. Savage
(74) *Attorney, Agent, or Firm*—Barnes & Thornburg (57) ABSTRACT

A fluid filter assembly includes a filter housing, a filter element, and an outlet conduit coupled to the filter housing to discharge liquid fluid from a filtered-fluid region in the filter element. An elongated grommet is mounted on the outlet conduit and positioned in the filter housing to seal against an outer surface of the filter element and an inner surface of the filter housing.

22 Claims, 5 Drawing Sheets

FLUID FILTER ASSEMBLY

BACKGROUND

The present disclosure relates to fluid filters, and in particular to filters for liquid fuel. More particularly, the present disclosure relates to fluid filter assemblies including sealed outlets for discharging filtered fuel to a destination outside the fluid filter assembly.

Fluid filters are used onboard vehicles and in other apparatus containing fluid transport systems to remove unwanted solids or other contaminants from the fluid. Oil filters and fuel filters are provided to clean oil and fuel used in vehicle engines. Filter seals are used to minimize unwanted leakage of fluids such as oil and fuel from a fluid filter.

SUMMARY

A fluid filter assembly in accordance with the present disclosure includes a filter housing, a filter element, and a fluid discharge system for discharging liquid fuel from a filtered-fluid region formed in the filter element to destinations outside of the filter housing. The fluid discharge system includes an outlet conduit extending from the filtered-fluid region through an aperture formed in the filter housing and an inlet conduit carrying liquid fuel into the filter housing for delivery to the filter element.

The fluid discharge system further includes an elongated grommet mounted to extend around the outlet conduit to lie in sealing engagement with the filter element and the filter housing. The grommet is arranged inside the filter housing to block unfiltered liquid fuel discharged into the filter housing through the inlet conduit from mixing with filtered fuel in the filtered-fluid region of the filter element.

In illustrative embodiments, an inner end of the elongated grommet is located to close and seal a gap between the filter element and the outlet conduit to block unwanted leakage of fluid from the filtered-fluid region into other spaces in the filter housing. An outer end of the elongated grommet is located to engage the filter housing. In one embodiment, the elongated grommet has a necked-down mid-portion providing the elongated grommet with an hour-glass shape. In other embodiments, the elongated grommet has a cylinder shape. In one embodiment, the length of the elongated grommet is about equal to the diameter of the inner end of the elongated grommet. In an illustrative embodiment, the fluid filter assembly is configured to filter fuel that is delivered from a fuel tank to an engine and the outlet conduit is adapted to return some of the filtered fuel to the fuel tank.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 9, 10, 11, 12, 13:
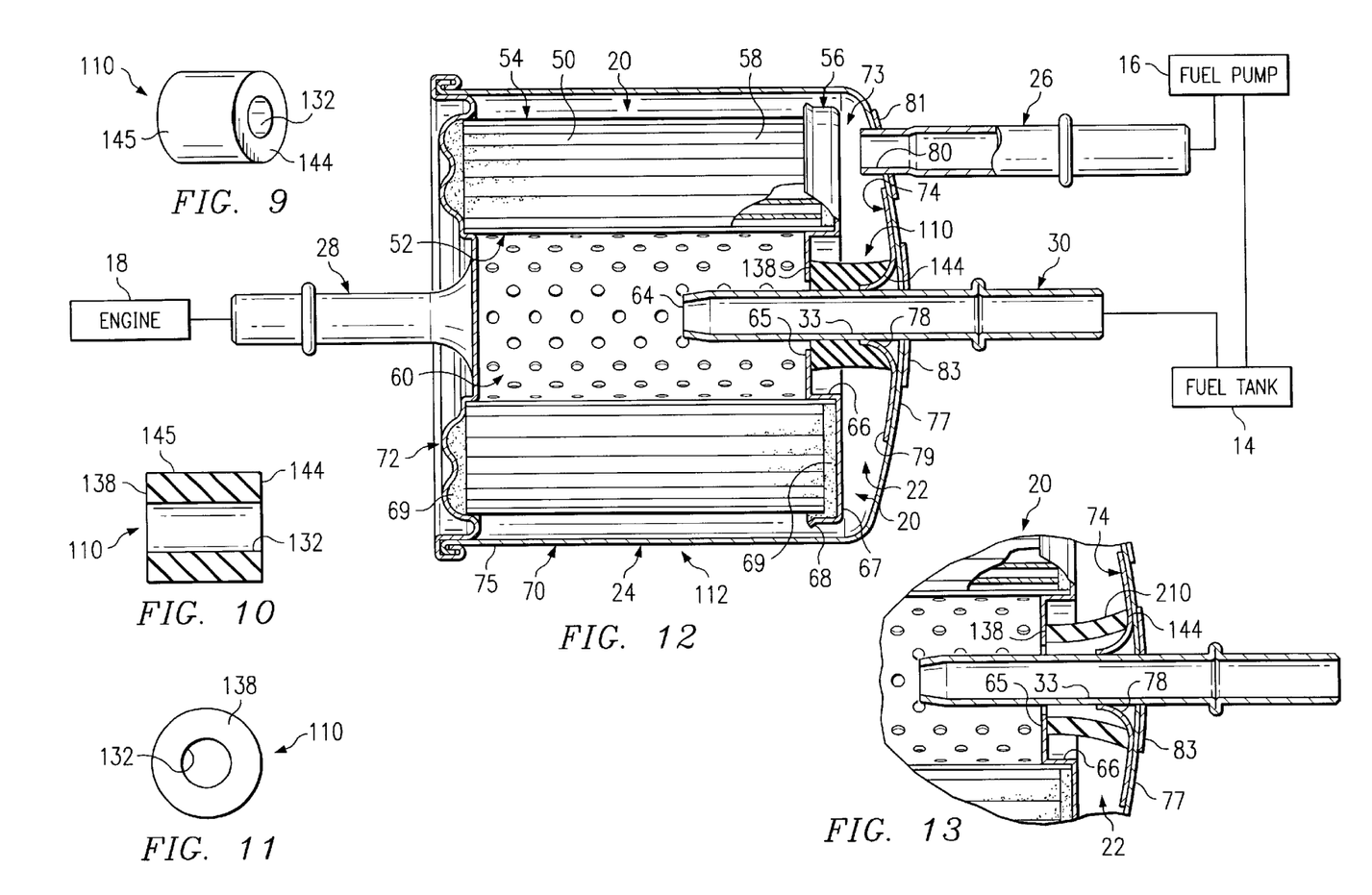
FIG. 9 is a perspective view of a second embodiment of an elongated grommet configured to be used in a fluid filter assembly in accordance with the present disclosure.
FIG. 10 is a sectional view of the elongated grommet taken along line 10-10 of FIG. 9.
FIG. 11 is a bottom view of the elongated grommet of FIG. 9.
FIG. 12 is a diagrammatic view similar to FIG. 2 showing the elongated grommet of FIG. 9 in a fluid filter assembly.
FIG. 13 is a sectional view similar to a portion of FIG. 12 of a third embodiment of an elongated grommet configured to be used in a fluid filter assembly in accordance with the present disclosure.

An elongated grommet 10 is provided as shown, for example, in FIGS. 1–6 for use in a fluid filter assembly 12 to manage flow of fluid in the assembly 12 so as to avoid unwanted mixing of unfiltered fluid with already filtered fluid inside fluid filter assembly 12. Another elongated grommet 110 is shown in FIGS. 9–12 and yet another grommet 210 is shown in FIG. 13. These grommets are configured to maintain sealing relationships with adjacent filter assembly components even if one or more of those components is mounted in a misaligned position in fluid filter assembly 12.

Fluid filter assembly 12 is used in an illustrative embodiment to filter liquid fuel that has been drawn from a fuel tank 14 by a fuel pump 16 before the fuel is delivered to an engine 18. Fluid filter assembly 12 includes a filter element 20 positioned to lie in a filter chamber 22 formed in a filter housing 24, an inlet conduit 26 adapted to receive fuel from fuel tank 14, a first outlet conduit 28 adapted to discharge fuel filtered by filter element 20 to engine 18, and a second outlet conduit 30 adapted to discharge some of the fuel filtered by filter element 20 to fuel tank 14. Each conduit 26, 28, and 30 is coupled to filter housing 24 to communicate with filter chamber 22 formed in filter housing 24 as shown, for example, in FIG. 2.

Figures 1, 2:
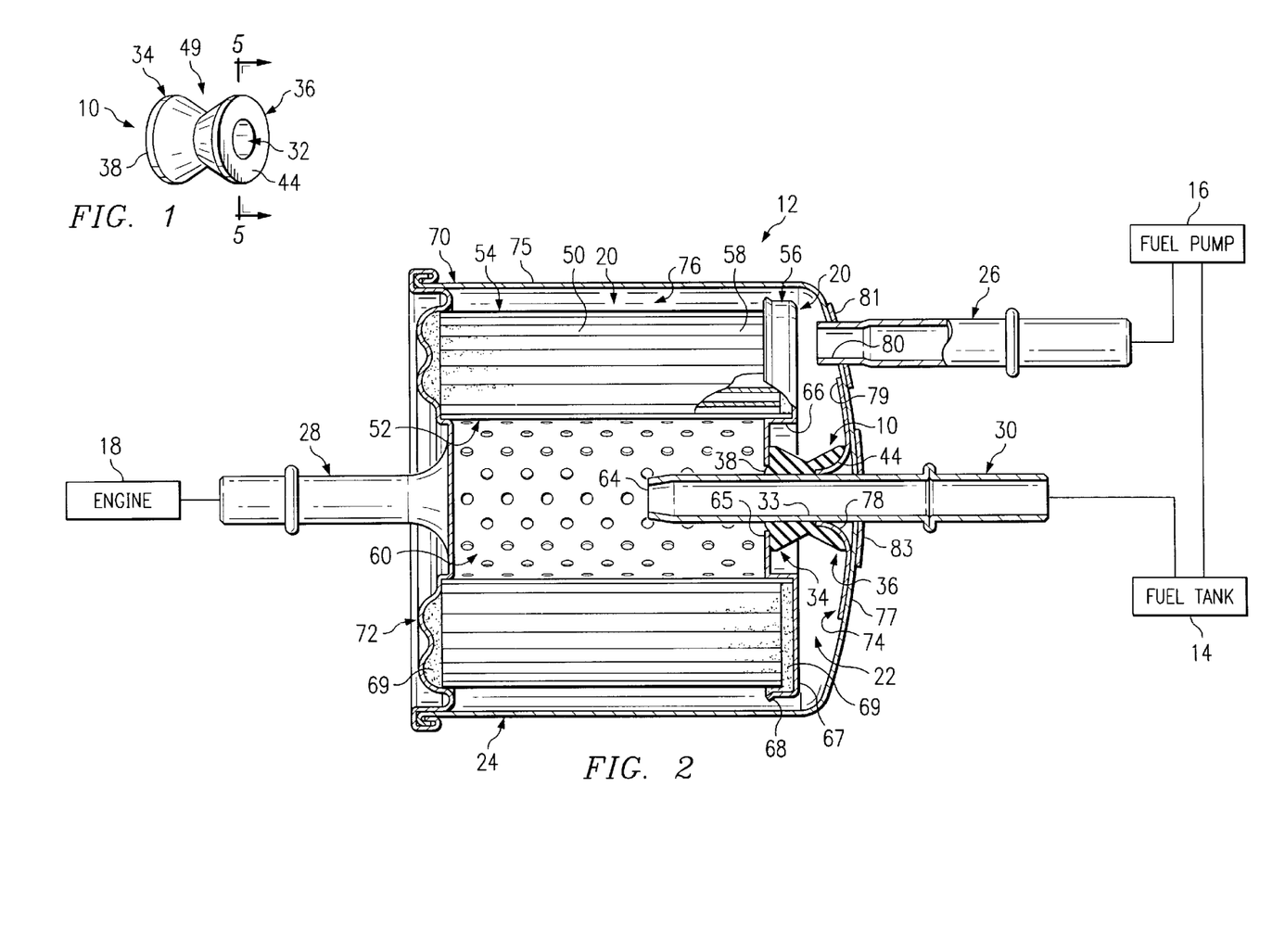
FIG. 1 is a perspective view of a first embodiment of an elongated grommet configured to be used in a fluid filter assembly in accordance with the present disclosure.
FIG. 2 is a diagrammatic view of a liquid fuel delivery system including a fluid filter assembly comprising a filter housing, a filter element, a first outlet conduit for conducting fuel from a filtered-fluid region in the filter element to an engine, and a second outlet conduit for conducting fuel from the filtered-fluid region in the filter element to the fuel tank and showing the elongated grommet of FIG. 1 carried on a central portion of the second outlet conduit to establish a seal between the filter element and the filter housing.
Figure 5:
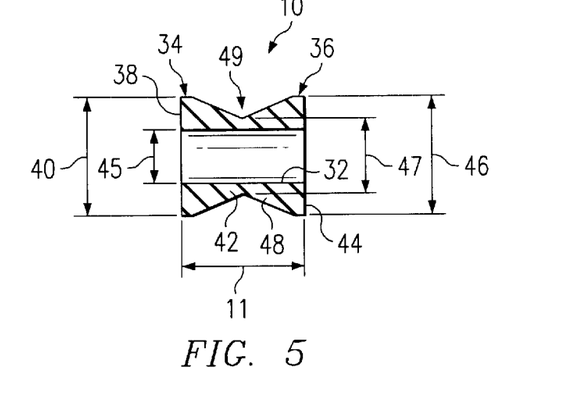
FIG. 5 is a sectional view of the elongated grommet taken along line 5-5 of FIG. 1 showing a central passageway extending therethrough.
Figure 6:
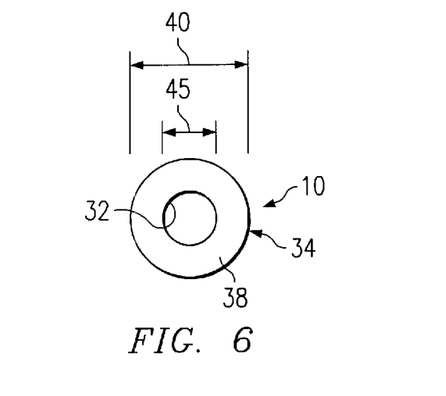
FIG. 6 is a bottom view of the elongated grommet of FIG. 1.

As shown in FIGS. 1, 2, and 5, grommet 10 is formed to include a passageway 32 sized to receive a central portion 33 of second outlet conduit 30 therein. Although in the illustrated embodiment, a fluid-tight seal is established between grommet 10 and central portion 33, it is within the scope of this disclosure to fit grommet 10 in a "loose" manner on central portion 33 without establishing a fluid-tight seal therebetween. Grommet 10 is a monolithic element made, for example, of VITON (V2174) material.

Figure 3:
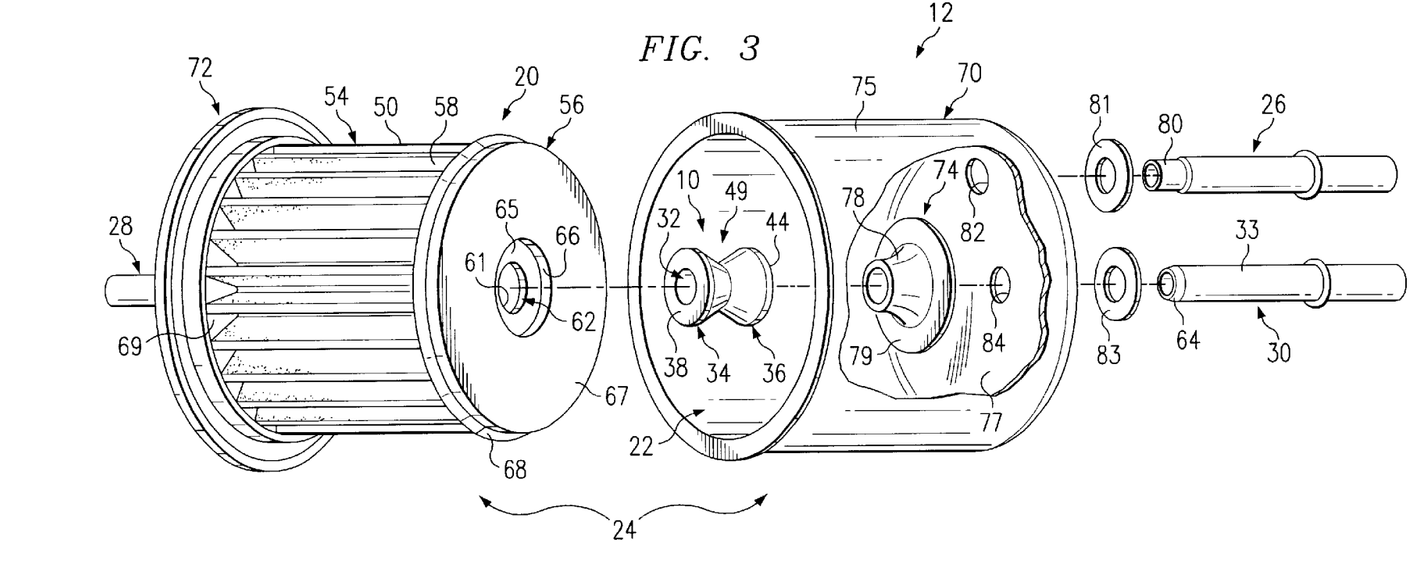
FIG. 3 is an exploded perspective assembly view of components that cooperate to form the fluid filter assembly of FIG. 2.

In one embodiment, grommet 10 comprises first and second frustoconical members 34, 36 arranged to lie in "end-to-end" relation as shown, for example, in FIGS. 1, 3, and 5 to provide grommet 10 with an "hour-glass" shape. First frustoconical member 34 has a large-diameter base 38 having a diameter 40 and a smaller-diameter top 42. Second frustoconical member 36 has a large-diameter base 44 having a diameter 46 about equal to diameter 40 and a smaller-diameter top 48 appended to smaller-diameter top of first frustoconical member 34 to form a "necked-down" section 49 of grommet 10. In the illustrated embodiment, the diameters 40, 46 of large-diameter bases 38, 44 are about equal to the length 11 of grommet 10. Each smaller-diameter top 42, 48 has a diameter 47 that is about 60% of diameter 40 of large-diameter base 38. Passageway 32 has an internal diameter 45 that is about one-half of diameter 40 of large-diameter base 38.

Filter element 20 includes a filter media 50 providing interior and exterior portions 52, 54 and an end cap 56 coupled to one end 58 of filter media 50 as shown, for example, in FIGS. 2 and 3. Interior portion 52 is configured to define a filtered-fluid region 60 located in filter element 20 to receive fluid in filter element 20 that has passed through filter media 50 from exterior portion 54 to interior portion 52. It is within the scope of this disclosure to use any suitable filter media. End cap 56 includes an interior edge 61 formed to define a conduit-receiving aperture 62 arranged to receive second outlet conduit 30 therein to locate an inlet end 64 of second outlet conduit 30 in filtered-fluid region 60 as shown, for example, in FIG. 2. End cap 56 includes inner disk 65, annular inner wall 66, outer disk 67, and annular outer wall 68 as shown, for example, in FIG. 3. PLASTISOL adhesive 69 or other suitable material is used to adhere end 58 of filter media 50 in a sealed fixed position to end cap 56.

Figure 4:
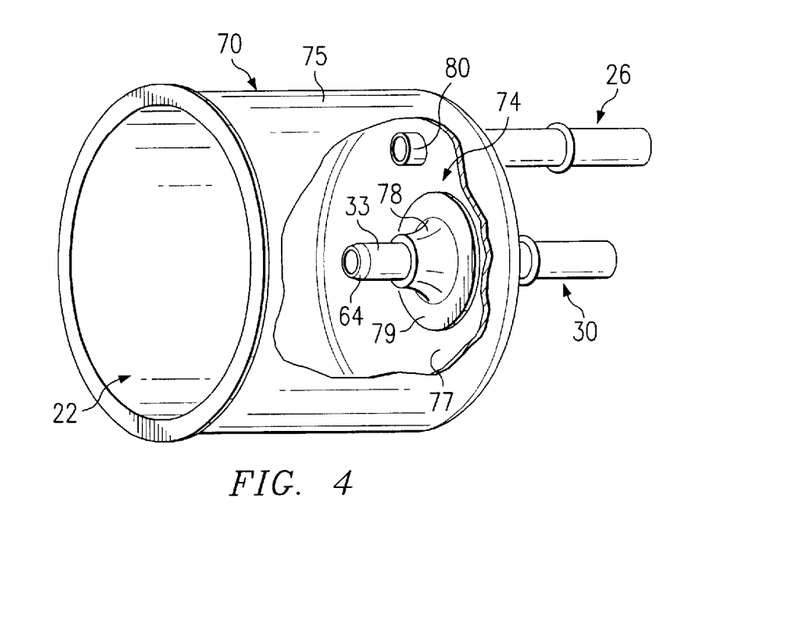
FIG. 4 is a perspective view similar to FIG. 3 showing the elongated grommet mounted on the second outlet conduit and arranged to lie in a filter chamber formed in the filter housing before insertion of the filter element in the filter chamber.

Filter housing 24 includes a cup 70, an end plate 72, and an internal conduit support hat 74 as shown, for example, in FIGS. 2–4. Cup 70 includes a side wall 75 arranged to surround filter element 20 to define an annular space 76 therebetween and a top wall 77 coupled to inlet conduit 26 and second outlet conduit 30 as shown, for example, in FIG. 2. End cap 56 is arranged to lie in spaced-apart relation to top wall 77 to define a space 73 receiving grommet 10 and internal conduit support hat 74 therein. Internal conduit support hat 74 includes a flared sleeve 78 adapted to receive and engage central portion 33 of second outlet conduit 30 and an annular base 79 appended to flared sleeve 78 and coupled to top wall 77 of housing cup 70 as suggested, for example, in FIGS. 2–4.

Base end 59 of filter media 50 is adhered to end plate 72 using PLASTISOL material 69 or other suitable material to mount filter element 20 in a sealed fixed position on end plate 72 as shown, for example, in FIGS. 2 and 3. End plate 72 is coupled to side wall 75 of housing cup 70 as suggested in FIGS. 2 and 3 to position filter element 20 in a fixed position in filter chamber 22 formed in filter housing 24. In the illustrated embodiment end plate 72 and first outlet conduit 28 cooperate to form a monolithic base for housing cup 70.

Inlet conduit 26 has an inner end 80 sized to carry a washer 81 and extend through an aperture 82 formed in top wall 77 of housing cup 70 as suggested, for example, in FIGS. 2–4. Likewise, second outlet conduit 30 is sized to carry a washer 83 and extend through an aperture 84 formed in top wall 77 of housing cup 70. Each conduit is brazed to its washer and each washer is brazed to top wall 77 to mount the conduits in place on housing cup 70 as shown, for example, in FIGS. 2 and 4. Internal conduit support hat 74 is also brazed to an interior surface of top wall 77.

Grommet 10 and second outlet conduit 30 cooperate to provide means for conducting fuel from filtered-fluid region 60 in filter element 20 through aperture 84 formed in filter housing 24 toward fuel tank 14. Grommet 10 is positioned to lie in filter chamber 22 in a space 73 between filter element 20 and filter housing 24. Grommet 10 is mounted on central portion 33 of second outlet conduit 30 to lie in sealing engagement with filter element 20 and filter housing 24, to block any unwanted fuel leakage of unfiltered fuel discharged into space 73 by inlet conduit 26 from the portion of space 73 around grommet 10 into filtered-fluid region 60 in filter element 20 through the opening 62 formed in filter element 20. In the illustrated embodiment, an inner end 38 of grommet 10 to lie in sealing engagement with inner disk 65 of end cap 56 of filter element 20 and an outer end 44 of grommet 10 to lie in sealing engagement with an interior surface of top wall 77 of filter housing 24 as shown, for example, in FIG. 2. Inner end 38 of grommet 10 engages end cap 56 to close any gap extant between interior edge 61 of end cap 56 and central portion 33 of second outlet conduit 30. Outer end 44 of grommet 10 sealingly engages internal conduit support hat 74.

Figure 7:
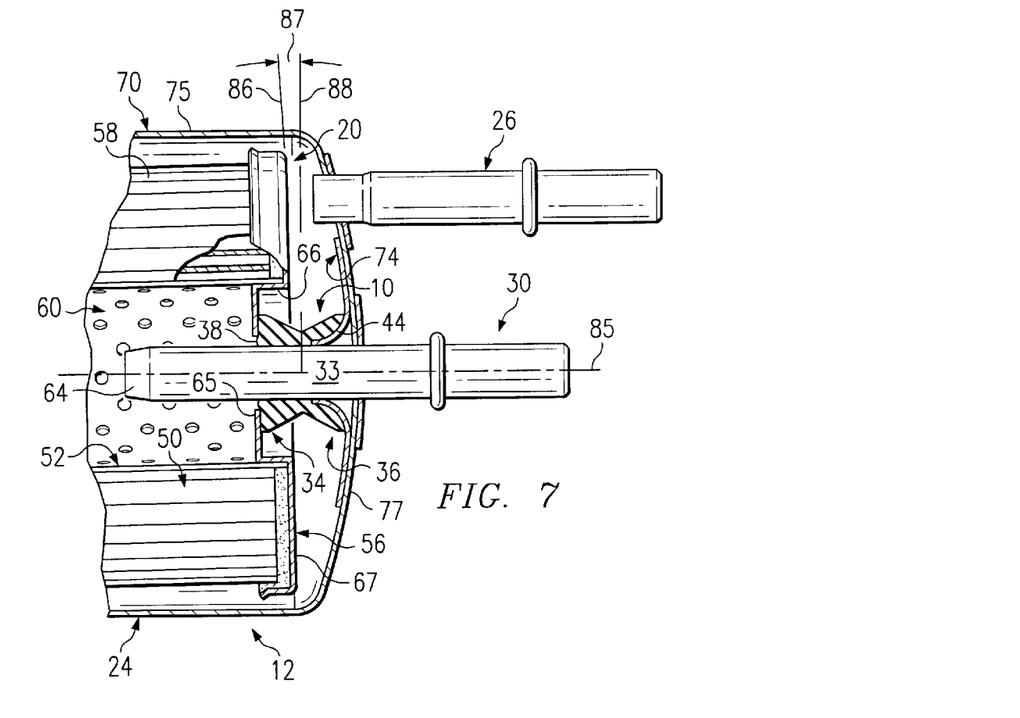
FIG. 7 is a view of a portion of the fluid filter assembly of FIG. 2 showing "misalignment" of the filter element in the filter chamber formed in the filter housing without "breakdown" of the seal established by the elongated grommet between the filter element and the filter housing.
Figure 8:
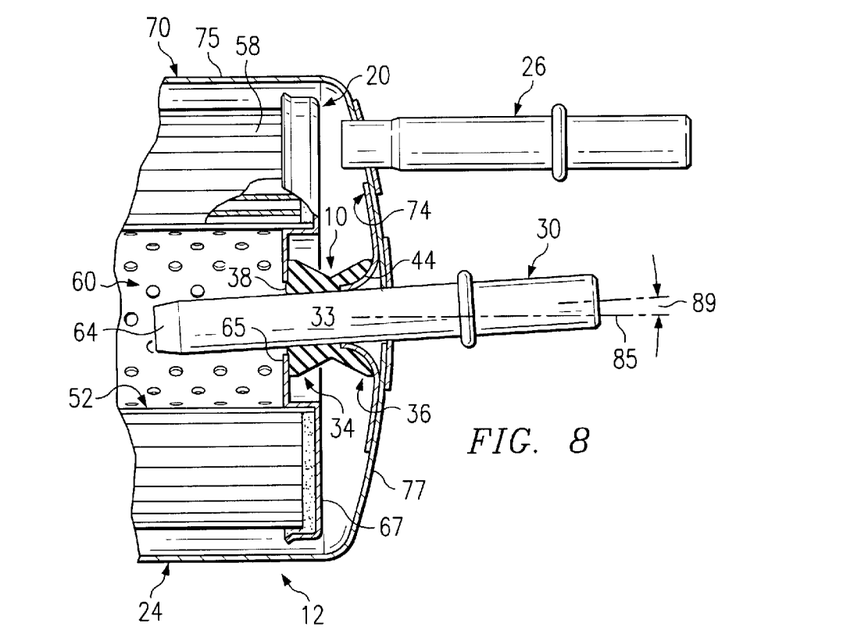
FIG. 8 is a view similar to FIG. 7 showing misalignment of the second outlet conduit in the outlet aperture formed in the filter housing without breakdown of the seal established by the elongated grommet between the filter element and the filter housing.

Grommet 10 is made of a pliable sealing material so as to permit relative movement between first and second frustoconical portions 34, 36 when certain components of fluid filter assembly 12 are misaligned with respect to filter housing 24. As shown, for example, in FIG. 7, grommet 10 deforms to maintain sealing engagement with end cap 56 and filter housing 24 in the event that filter element 20 is misaligned within filter housing 24 (e.g. canted relative to axis 85 to cause a plane 86 defined by outer disk 67 to lie at an angle 87 relative to vertical plane 88). As shown, for example, in FIG. 8, grommet 10 deforms to maintain sealing engagement with end cap 56 and filter housing 24 in the event that second outlet conduit 30 is misaligned relative to filter housing 24 (e.g. canted at an angle 89 relative to axis 85). Although grommet 10 comprises two mating frustoconical portions 34, 36 in the embodiment shown in FIGS. 1–8, it is within the scope of this disclosure to vary the shape of portions 34, 36 somewhat while maintaining a necked-down section 49.

Referring now to FIGS. 9–12, a grommet 110 is mounted on central portion 33 of second outlet conduit 30 instead of grommet 10. Grommet 110 is made of a material similar to grommet 10 and is formed to include passageway 132, inner end 138, outer end 144, and cylindrical side wall 145. As shown in FIG. 13, a grommet 210 is mounted loosely on central portion 33 of second outlet conduit 30 without establishing a fluid-tight seal therebetween. Nevertheless, in each of the embodiments shown in FIGS. 9–12 and 13, the grommets 110, 210 are arranged to have an inner end positioned to lie in sealing engagement with filter element 20 and an outer end positioned to lie in sealing engagement with filter housing 24 to establish a seal therebetween so that unfiltered fluid in filter chamber 22 does not bypass filter element 20 by leaking into filtered-fluid region 60 in filter element 20.

What is claimed is:

1. A fluid filter assembly comprising
a filter housing formed to include a filter chamber,
a filter element positioned to lie in the filter chamber, the filter element including an exterior portion located in the filter chamber to contact a fluid admitted into the filter chamber through an inlet conduit coupled to the housing, the filter element being formed to include an interior portion defining a filtered-fluid region located in the filter element to receive fluid in the filter element that has passed through the filter element from the exterior portion to the interior portion,
an outlet conduit having an inlet end and an opposite outlet end, the outlet conduit being arranged to extend through an aperture formed in the filter housing to cause the inlet end to lie in the filtered-fluid region and the outlet end to lie outside of the filter housing, and
an elongated grommet formed to include a passageway containing a central portion of the outlet conduit, the elongated grommet being positioned to lie in the filter chamber in a space between the filter element and the filter housing to cause an inner end of the elongated grommet to lie in sealing engagement with the filter element and an outer end of the elongated grommet to lie in sealing engagement with an interior surface of the filter housing
wherein the filter element includes a filter media providing the interior and exterior portions and an end cap coupled to one end of the filter media, the end cap includes an interior edge formed to define a conduit-receiving aperture providing an opening into the filtered-fluid region of the filter element, the outlet conduit passes through the conduit-receiving aperture formed in the end cap to locate the inlet end of the outlet conduit in the filtered-fluid region of the filter element, the inner end of the elongated grommet engages the end cap to close any gap extant between the interior edge of the end cap and the outlet conduit, wherein the filter housing includes an internal conduit support hat positioned in the filter chamber and formed to include a conduit receiving aperture through which the outlet conduit extends, and the internal conduit support hat extends through an opening formed in the outer end of the elongated grommet into the passageway.

2. The assembly of claim 1, wherein the internal conduit support hat includes a flared sleeve arranged to engage the outer end of the elongated grommet to deform the outer end.

3. The assembly of claim 1, wherein the end cap includes an axially facing surface, and the axially facing end surface of the inner end of the elongated grommet engages the axially facing surface of the end cap.

4. A fluid filter assembly comprising
a filter housing formed to include a filter chamber,
a filter element positioned to lie in the filter chamber, the filter element including an exterior portion located in the filter chamber to contact a fluid admitted into the filter chamber through an inlet conduit coupled to the housing, the filter element being formed to include an interior portion defining a filtered-fluid region located in the filter element to receive fluid in the filter element that has passed through the filter element from the exterior portion to the interior portion,
a first outlet conduit coupled to the housing and arranged to conduct fluid from the filtered-fluid region in the filter element to a first destination outside of the filter housing,
a second outlet conduit having an inlet end and an opposite outlet end, the second outlet conduit being arranged to extend through an aperture formed in the filter housing to cause the inlet end to lie in the filtered-fluid region and the outlet end to lie outside of the filter housing, and
an elongated grommet formed to include a passageway containing a central portion of the second outlet conduit, the elongated grommet being positioned to lie in the filter chamber in a space between the filter element and the filter housing to cause an inner end of the elongated grommet to lie in sealing engagement with the filter element and an outer end of the elongated grommet to lie in sealing engagement with an interior surface of the filter housing, wherein the filter element includes a filter media providing the interior and exterior portions and an end cap coupled to one end of the filter media, the end cap includes an interior edge formed to define a conduit-receiving aperture providing an opening into the filtered-fluid region of the filter element, the second outlet conduit passes through the conduit-receiving aperture formed in the end cap to locate the inlet end of the second outlet conduit in the filtered-fluid region of the filter element, the inner end of the elongated grommet engages the end cap to close any gap extant between the interior edge of the end cap and the second outlet conduit, and the elongated grommet is a monolithic element comprising a first frustoconical member having a large-diameter base positioned to engage the end cap and a smaller-diameter top and a second frustoconical member having a large-diameter base positioned to engage the interior surface of the filter housing and a smaller-diameter top appended to the smaller-diameter top of the first frustoconical member to form a necked-down section of the elongated grommet and provide the elongated grommet with an hour-glass shape.

5. The assembly of claim 4, wherein the elongated grommet has a predetermined length and the diameter of each large-diameter base is about equal to the predetermined length of the elongated grommet.

6. The assembly of claim 4, wherein the smaller-diameter top of each of the first and second frustoconical members has a diameter that is about 60% of the diameter of the large-diameter base of the first frustoconical member.

7. The assembly of claim 4, wherein the passageway formed in the elongated grommet has an internal diameter that is about half of the diameter of the large-diameter base of the first frustoconical member.

8. A fluid filter assembly comprising
a filter housing formed to include a filter chamber,
a filter element positioned to lie in the filter chamber, the filter element including an exterior portion located in the filter chamber to contact a fluid admitted into the filter chamber through an inlet conduit coupled to the housing, the filter element being formed to include an interior portion defining a filtered-fluid region located in the filter element to receive fluid in the filter element that has passed through the filter element from the exterior portion to the interior portion,
a first outlet conduit coupled to the housing and arranged to conduct fluid from the filtered-fluid region in the filter element to a first destination outside of the filter housing, a second outlet conduit having an inlet end and an opposite outlet end, the second outlet conduit being arranged to extend through an aperture formed in the filter housing to cause the inlet end to lie in the filtered-fluid region and the outlet end to lie outside of the filter housing, and an elongated grommet formed to include a passageway containing a central portion of the second outlet conduit, the elongated grommet being positioned to lie in the filter chamber in a space between the filter element and the filter housing to cause an inner end of the elongated grommet to lie in sealing engagement with the filter element and an outer end of the elongated grommet to lie in sealing engagement with an interior surface of the filter housing, wherein the filter element includes a filter media providing the interior and exterior portions and an end cap coupled to one end of the filter media, the end cap includes an interior edge formed to define a conduit-receiving aperture providing an opening into the filtered-fluid region of the filter element, the second outlet conduit passes through the conduit-receiving aperture formed in the end cap to locate the inlet end of the second outlet conduit in the filtered-fluid region of the filter element, the inner end of the elongated grommet engages the end cap to close any gap extant between the interior edge of the end cap and the second outlet conduit, and the elongated grommet is cylinder-shaped, wherein the filter housing includes an internal conduit support hat positioned in the filter chamber and formed to include a second outlet conduit receiving aperture through which the second outlet conduit extends, and the internal conduit support hat extends through an opening formed in the outer end of the elongated grommet into the passageways.

9. A fluid filter assembly comprising a filter housing formed to include a filter chamber, a filter element positioned to lie in the filter chamber, the filter element including an exterior portion located in the filter chamber to contact a fluid admitted into the filter chamber through an inlet conduit coupled to the housing, the filter element being formed to include an interior portion defining a filtered-fluid region located in the filter element to receive fluid in the filter element that has passed through the filter element from the exterior portion to the interior portion, a first outlet conduit coupled to the housing and arranged to conduct fluid from the filtered-fluid region in the filter element to a first destination outside of the filter housing, a second outlet conduit having an inlet end and an opposite outlet end, the second outlet conduit being arranged to extend through an aperture formed in the filter housing to cause the inlet end to lie in the filtered-fluid region and the outlet end to lie outside of the filter housing, and an elongated grommet formed to include a passageway containing a central portion of the second outlet conduit, the elongated grommet being positioned to lie in the filter chamber in a space between the filter element and the filter housing to cause an inner end of the elongated grommet to lie in sealing engagement with the filter element and an outer end of the elongated grommet to lie in sealing engagement with an interior surface of the filter housing, wherein the filter housing includes a cup and an internal conduit support hat, the cup includes a side wall arranged to surround the filter element and a top wall coupled to the inlet conduit and formed to include a conduit-receiving aperture, the internal conduit support hat is positioned to lie in the filter chamber between the top wall and the elongated grommet and is formed to include a conduit-receiving aperture, and the second outlet conduit is arranged to extend in series through the conduit-receiving apertures formed in the top wall and internal conduit support hat and into the filtered-fluid region of the filter element.

10. The assembly of claim 9, wherein the filter element includes a filter media providing the inner and outer portions and an end cap coupled to one end of the filter media, the end cap includes an interior edge formed to include a conduit-receiving aperture providing an opening into the filtered-fluid region of the filter element, the second outlet conduit also passes through the conduit-receiving aperture formed in the end cap to locate the inlet end of the second outlet in the filtered-fluid region of the filter element, and the inner end of the elongated grommet engages the end cap to close any gap extant between the interior edge of the end cap and the second outlet conduit.

11. The assembly of claim 10, wherein the inner end of the elongated grommet has a predetermined diameter, the elongated grommet further includes a necked-down section arranged to lie between the inner and outer ends, and the necked-down section has an external diameter that is about 60% of the predetermined diameter of the inner end of the elongated grommet.

12. The assembly of claim 9, wherein the elongated grommet is a monolithic element comprising a first frustoconical member and a second frustoconical member.

13. The assembly of claim 9, wherein the first frustoconical member has a base defining the inner end and the second frustoconical member has a base defining the outer end.

14. A fluid filter assembly comprising a filter housing formed to include a filter chamber, an inlet aperture adapted to admit fluid into the filter chamber, and an outlet aperture adapted to discharge fluid from the filter chamber, a filter element positioned to lie in the filter chamber and formed to include a filtered-fluid region located to receive fluid that has passed through the filter element, an elongated grommet having inner and outer ends and a passageway extending from an opening formed in the inner end to an opening formed in the outer end, the elongated grommet being oriented to place the opening formed in the inner end in communication with an opening formed in the filter element into the filtered-fluid region and to place the opening formed in the outer end in communication with the outlet aperture formed in the filter housing, and an outlet conduit passing through the outlet aperture formed in the filter housing, the openings formed in the outer and inner ends of the elongated grommet and the filter element, and the passageway formed in the elongated grommet, the outlet conduit being formed to include a passageway to conduct fluid from the filtered-fluid region in the filter element to a destination outside the filter housing, the elongated grommet being arranged to lie in sealing engagement with the filter element and the filter housing to block flow of unfiltered fluid admitted into the filter chamber through the inlet aperture into the filtered-fluid region in the filter element through the opening formed in the filter element, wherein the filter housing includes an internal conduit support hat positioned in the filter chamber and formed to include a conduit-receiving aperture through which the outlet conduit extends, and the internal conduit support hat extends through the opening formed in the outer end of the elongated grommet into the passageway formed in the elongated grommet.

15. The assembly of claim 14, wherein the filter element includes a filter media formed to include the filtered-fluid region and an end cap coupled to one end of the filter media, the end cap includes an interior edge formed to define the opening into the filtered-fluid region, and the inner end of said grommet is arranged to engage the end cap to close any gap extant between the interior edge of the end cap and the outlet conduit.

16. The assembly of claim 14, wherein the elongated grommet is a monolithic element comprising a first frustoconical member and a second frustoconical member.

17. The assembly of claim 14, wherein the elongated grommet has a cylindrical shape and a predetermined length and the inner end has a diameter that is about equal to the predetermined length.

18. A fluid filter assembly comprising
a filter housing formed to include a filter chamber, an inlet aperture adapted to admit fluid into the filter chamber, and a first outlet aperture adapted to discharge fluid from the filter chamber,
a filter element positioned to lie in the filter chamber and formed to include a filtered-fluid region located to receive fluid that has passed through the filter element and to communicate with the first outlet aperture to permit fluid to flow from the filtered-fluid region through the first outlet aperture to a first destination outside the filter housing,
an elongated grommet having inner and outer ends and a passageway extending from an opening formed in the inner end to an opening formed in the outer end, the elongated grommet being oriented to place the opening formed in the inner end in communication with an opening formed in the filter element into the filtered-fluid region and to place the opening formed in the outer end in communication with a second outlet aperture formed in the filter housing, and
an outlet conduit passing through the second outlet aperture formed in the filter housing, the openings formed in the outer and inner ends of the elongated grommet and the filter element, and the passageway formed in the elongated grommet, the outlet conduit being formed to include a passageway to conduct fluid from the filtered-fluid region in the filter element to a second destination outside the filter housing, the elongated grommet being arranged to lie in sealing engagement with the filter element and the filter housing to block flow of unfiltered fluid admitted into the filter chamber through the inlet aperture into the filtered-fluid region in the filter element through the opening formed in the filter element, wherein the elongated grommet is a monolithic element comprising a first frustoconical member having a large-diameter base positioned to engage the end cap and a smaller-diameter top and a second frustoconical member having a large-diameter base positioned to engage the interior surface of the filter housing and a smaller-diameter top appended to the smaller-diameter top of the first frustoconical member to form a necked-down section of the elongated grommet and provide the elongated grommet with an hour-glass shape.

19. A fluid filter assembly comprising
a filter housing formed to include a filter chamber,
a filter element positioned to lie in the filter chamber, and
means for conducting fluid from a filtered-fluid region formed in the filter element through an aperture formed in the filter housing to a destination outside of the filter housing, the conducting means including an elongated grommet lying in the filter chamber and having an inner end positioned to lie in sealing engagement with the filter element and an outer end positioned to lie in sealing engagement with the filter housing, wherein the conducting means includes an outlet conduit extending from the filtered-fluid region through an aperture formed in the filter element, a passageway formed in the elongated grommet, and the aperture formed in the filter housing to the destination outside of the filter housing, the filter housing includes an internal conduit support hat positioned in the filter chamber and formed to include an aperture through which the outlet conduit extends, the internal conduit support hat extends into the passageway formed in the elongated grommet.

20. The assembly of claim 19, wherein the elongated grommet is formed to include a passageway extending therethrough, the conducting means further includes an outlet conduit arranged to pass through the passageway, and the outlet conduit includes, an inner end positioned to lie in the filtered-fluid region.

21. The assembly of claim 19, wherein the elongated grommet is a monolithic element comprising a first frustoconical member defining the inner end and a second frustoconical member defining the outer end.

22. The assembly of claim 19, wherein the internal conduit support hat tapers radially inwardly as it extends axially inwardly in the passageway formed in the elongated grommet.

* * * * *